United States Patent
Sointula (10) Patent No.: US 7,245,888 B2
(45) Date of Patent: Jul. 17, 2007

(54) PHONE ENERGY MANAGEMENT FOR LOW BATTERY VOLTAGES

(75) Inventor: Erkka Sointula, Salo (FI)

(73) Assignee: Nokia Corporation, Espoo (FI)

( * ) Notice: Subject to any disclaimer, the term of this patent is extended or adjusted under 35 U.S.C. 154(b) by 444 days.

(21) Appl. No.: 10/869,480

(22) Filed: Jun. 16, 2004

(65) Prior Publication Data

US 2005/0281063 A1 Dec. 22, 2005

(51) Int. Cl.
*H04B 1/04* (2006.01)

(52) U.S. Cl. .............................. 455/127.1; 455/127.5; 455/572; 323/267

(58) Field of Classification Search ............. 455/127.1, 455/127.5, 572, 573, 574, 343.1, 343.5, 343.6; 323/267, 268, 273, 274; 363/60, 63, 97, 363/34, 37, 89; 320/128, 150, 134, 149
See application file for complete search history.

(56) References Cited

U.S. PATENT DOCUMENTS

| | | | | |
|---|---|---|---|---|
| 3,821,627 A | * | 6/1974 | Milovancevic et al. | ........ 363/60 |
| 4,636,709 A | * | 1/1987 | Ohsawa | ........ 323/267 |
| 4,995,072 A | * | 2/1991 | Pedigo | ........ 455/572 |
| 5,264,777 A | * | 11/1993 | Smead | ........ 320/128 |
| 5,384,564 A | * | 1/1995 | Wycoff et al. | ........ 455/343.3 |
| 5,452,472 A | * | 9/1995 | Tanaka | ........ 455/343.2 |
| 5,519,711 A | | 5/1996 | Sointula | |
| 5,546,051 A | * | 8/1996 | Koizumi et al. | ........ 455/127.4 |
| 5,563,496 A | * | 10/1996 | McClure | ........ 320/128 |
| 5,684,686 A | * | 11/1997 | Reddy | ........ 363/97 |
| 5,726,650 A | * | 3/1998 | Yeoh et al. | ........ 455/343.2 |
| 5,864,221 A | * | 1/1999 | Downs et al. | ........ 320/134 |
| 6,060,864 A | * | 5/2000 | Ito et al. | ........ 363/97 |
| 6,803,766 B2 | * | 10/2004 | Kobayashi et al. | ........ 320/149 |

\* cited by examiner

*Primary Examiner*—Lana Le
(74) *Attorney, Agent, or Firm*—Ware, Fressola, Van Der Sluys & Adolphson LLP (57) ABSTRACT

The present invention provides a power supply arrangement with a DC-to-DC converter (10) for providing at least one supply voltage to a load (20, 30, 40) from an energy source (11). The converter comprises means for inputting (4) a battery voltage from the energy source to output a voltage in a predetermined battery voltage range and a transfer circuit (8) connected to said means for inputting, to convert the battery voltage to at least one supply voltage in such a way that the supply voltage will be opposite in polarity to the battery voltage and the absolute value of the supply voltage will be the same or close to the absolute value of the battery voltage. The arrangement also comprises means for controlling (2), connected to the means for inputting, to control the supply voltage independent from the battery voltage using a single converting mode for the supply voltage range. The advantage of the arrangement is to supply continuously and ripple-free to the load the supply voltage range independent from but opposite in polarity to the battery voltage.

68 Claims, 7 Drawing Sheets

PHONE ENERGY MANAGEMENT FOR LOW BATTERY VOLTAGES

TECHNICAL FIELD OF THE INVENTION

This invention relates generally to a portable electronic device comprising DC-to-DC converter power supplies, and more particularly to a mobile communication device comprising a switched mode power supply (SMPS) in which a DC supply as a energy source is arranged to supply operating voltage in a desired voltage range of this energy source to various electronic parts of the device.

BACKGROUND OF THE INVENTION

A voltage range of energy sources, such as batteries, fuel cells, etc., for portable electronic devices tends to broaden and a minimum voltage of the range tends to go further down. Contemporaneously, portable electronic devices comprise many electronic components and circuits which need for optimum operation a supply voltage adjusted for their specific purposes.

Mobile communication devices such as mobile phones and portable communication terminals employ batteries, e.g. lithium ion batteries or the like, as their input power source. In mobile phones the battery supplies power through electronic circuitry to a load, e.g. a high frequency power amplifier in connection with a transmitter/transceiver. A powerful signal generated and transmitted by the wireless transmitter/transceiver draws more power from the battery than when a lower power signal is generated and transmitted. In the power amplifiers the operating voltage is selected in a technical sense so that the gain of the transmitter is adjusted so as to not transmit a RF signal more powerful than necessary for adequate communications. To do this, the power supply from the battery to the load is typically managed by the electronic circuitry comprising a switching regulator which is controlled by a control circuit to adjust the operating voltage for the power amplifier in the transmitter/transceiver.

A switching regulator used in battery-driven equipment is typically a DC-to-DC converter which converts battery voltages into the various voltages required by the supplied device. The DC-to-DC converter changes the DC energy from one level to another by changing the input energy into a different impedance level. The DC-to-DC converter provides a regulated output voltage based upon an input voltage and can generate output voltages higher or lower than the input voltage. Today, switched mode power supplies (SMPS) have gained popularity as DC-to-DC converters in battery-driven electronic devices because their efficient design meets well the size and power requirements of such devices.

The output voltage of the battery is called here a battery voltage and the voltage to supply a load is referred to as a supply voltage. The battery gives the battery voltage within a predetermined variation range between a minimum and maximum battery voltage. The supply voltage is fed to the load within a predetermined variation range between a minimum and maximum supply voltage.

There is a trend that for example future lithium based batteries will have a battery voltage range from approximately two volts to 4.5 volts. This means that the battery gives from the maximum battery voltage of 4.5 volts (when in charge) to the minimum battery voltage of close to 2 volts. This will bring about a challenge how to manage an appropriate power supply for some electronic circuits used in mobile communication devices. For example, as well known it is very challenging to design a high frequency power amplifier (PA) for supply voltages at close range to two volts. One solution for this has been to use a high efficiency DC-to-DC converter, e.g. a switched mode power supply (SMPS), to regulate the supply voltage just below the minimum battery voltage. But in addition to design complexity this solution brings another drawback, namely it will lead to efficiency loss in the energy conversion. Another solution has been to convert the supply voltage at close range of above 4.5 volts. The drawback of this solution is that the voltages at close range to above 4.5 volts are too close to the maximum voltages of the semiconductor processes designed for use in future power amplifier manufacturing. Then, the optimum choice for a supply voltage to the power amplifier would be in the range of 3 to 4 volts.

In prior art the solutions mentioned above have been accomplished mostly by the following three means. Firstly, a lower than minimum battery voltage of the same polarity is used for all mobile phone functions by means of linear regulators. Secondly, the DC-to-DC converter converts the whole battery voltage range to a voltage of the same polarity but lower than the minimum battery voltage of the battery voltage range or higher than the maximum battery voltage of the battery voltage range. Thirdly, the DC-to-DC converter converts the whole battery voltage range to a voltage of the same polarity within the battery voltage range.

The optimum supply voltage range of 3 to 4 volts for supplying the power amplifier by the above-mentioned means provides that the DC-to-DC converter should operate in two modes, namely stepping up and stepping down, depending on the battery's charge state. Thus the step-up and step-down converters are used. When the battery voltage is higher than the supply voltage required by the load including the power amplifier, the voltage is set to a predetermined supply voltage by the stepdown operation mode. When the battery voltage is decreased and becomes lower than the supply voltage required by the load including the power amplifier, the voltage is set to a predetermined supply voltage by the step-up operation mode.

In prior art solutions to provide a desired supply power range there are problems caused by the DC-to-DC converters capable of a two-mode operation depending on the battery's respective charge state. Problems will arise due to delay in switching between step-up mode and step-down mode, because there is a danger for oscillation between these modes. This oscillation danger is particularly relevant when the supply voltage needs to be modulated in the power amplifiers for envelope restoration (ER) transmitter solutions. Further the use of these types of DC-to-DC converters such as step-up and step-down converters leads to higher cost and component count, as well as poorer efficiency which shortens the use time of the battery.

As battery-driven portable communication devices such as mobile phones are considered to be proceeding toward being more multi-functioning electronic devices with each passing year, there will arise a problem caused by the complexity of the power supply circuitry according to prior art. To configure the power supply circuitry capable of performing the complex control by using standard electronic parts, will increase the number of parts and reduce the packaging density. For its part, this causes problems in reducing the size of the battery-driven electronic devices which objective is particularly emphasized on the design of mobile phones and other wireless communication terminals.

The problems set forth above are overcome by providing a power supply circuit for a battery-driven mobile communication device, which is capable of supplying voltage within an optimum supply voltage range to the load continuously without any mode change according to the embodiments of the present invention.

SUMMARY OF THE INVENTION

It is an object of the invention to provide a power supply arrangement for a mobile communication device, which is capable of continuously supplying voltage within a supply voltage range which is in the middle of the battery voltage range, thereby optimizing the efficient operation of the device. It is a preferred object of the invention to provide a power supply arrangement for a power amplifier, which is capable of continuously supplying voltage within a supply voltage range which is in the middle of the battery voltage range. It is a further object of the invention to provide a method, system and communication device thereto.

It is another object of the invention to provide a power supply arrangement for a mobile communication device, which is capable of reducing the number of parts and thereby reducing the electronic circuit complexity and the size of the power supply circuit and the battery-driven mobile communication device, and ensuring the efficient operation of the device. It is another preferred object of the invention to provide a power supply circuit for a power amplifier, which is capable of reducing the number of parts. It is a further object of the invention to provide a method, system and communication device thereto.

It is a further object of the invention to provide a power supply arrangement for a mobile communication device, which is capable of modulating the supply voltage in an envelope restoration (ER) power amplifier without danger of oscillation problems, thereby ensuring the efficient operation of the device. It is a further preferred object of the invention to provide a power supply arrangement for a power amplifier, which is capable of modulating the supply voltage in an envelope elimination and restoration (EER) power amplifier without danger of oscillation problems. It is a further object of the invention to provide a method, system and mobile communication device thereto.

The object(s) of the invention are achieved by providing a method, system, power supply arrangement and mobile communication device in which a regulated supply voltage is supplied continuously to the load and the DC-to-DC convertion covers the whole battery voltage range without changing mode and mode change drawbacks.

In accordance with a first aspect of the invention there is provided a power supply arrangement for providing at least one supply voltage to a load from an energy source, wherein the power supply circuit comprises:
  means for inputting a battery voltage from the energy source arranged to output voltage in a predetermined battery voltage range,
  means for converting, connected to said means for inputting, arranged to convert the battery voltage to at least one supply voltage in such a way that the supply voltage is to be opposite in polarity to the battery voltage and the absolute value of the supply voltage is to be the same or close to the absolute value of the battery voltage, and
  means for controlling, connected to the means for inputting, arranged to control the supply voltage independent from the battery voltage using a single converting mode for the supply voltage range.

In one preferred embodiment of the invention there is provided a power supply arrangement comprising means for changing a polarity of the energy source in accordance with the control signal.

Preferably, means for converting comprises a switched mode power supply (SMPS) connected to at least one means for switching.

In another preferred embodiment of the invention there is provided means for controlling connected to a modulation portion of the transmitter to be arranged to receive a modulated radio frequency signal from the modulation portion.

Preferably, means for controlling connected to a modulation portion of the envelope elimination and restoration (EER) transmitter is arranged to receive a modulated radio frequency signal from an amplitude modulator of the modulator portion of the envelope elimination and restoration (EER) transmitter.

In accordance with a second aspect of the invention there is provided a method for providing at least one supply voltage to a load from an energy source in a portable communication device comprising at least one load, wherein the method comprises steps of:
  outputting voltage from the energy source in a predetermined battery voltage range as a battery voltage,
  converting the battery voltage to at least one supply voltage to be opposite in polarity to the battery voltage,
  converting the battery voltage to at least one supply voltage so that the absolute value of the supply voltage is to be the same or close to the absolute value of the battery voltage, and
  controlling the supply voltage independently from the battery voltage using a single converting mode for the supply voltage range.

In one preferred embodiment of the invention the method comprises a step of changing a polarity of the energy source in accordance with a control signal.

In another preferred embodiment of the invention there is provided a control signal which is a modulated radio frequency signal received from a transmitter.

Preferably, a control signal is a modulated radio frequency signal received from an amplitude modulation chain in the envelope elimination and restoration (EER) transmitter.

In accordance with a third aspect of the invention there is provided a system for providing at least one supply voltage to a load from an energy source connected to the load in a portable communication device comprising at least one load, wherein the system comprises:
  the energy source arranged to output voltage in a predetermined battery voltage range as a battery voltage,
  means for inputting a battery voltage from the energy source arranged to output voltage in a predetermined battery voltage range,
  means for converting, connected to said means for inputting, arranged to convert the battery voltage to at least one supply voltage in such a way that the supply voltage is to be opposite in polarity to the battery voltage and the absolute value of the supply voltage is to be the same or close to the absolute value of the battery voltage,
  means for controlling, connected to the means for inputting, arranged to control the supply voltage independent from the battery voltage using a single converting mode for the supply voltage range, and
  the load connected to the output of means for converting arranged to receive continuously the supply voltage.

In one preferred embodiment of the invention there is provided a system which comprises means for changing a polarity of the energy source in accordance with the control signal.

Preferably, means for converting comprises a switched mode power supply (SMPS) connected to at least one means for switching.

In another preferred embodiment of the invention there is provided means for controlling connected to a modulation portion of the transmitter to be arranged to receive a modulated radio frequency signal from the modulation portion.

Preferably, means for controlling connected to a modulation portion of the envelope elimination and restoration (EER) transmitter is arranged to receive a modulated radio frequency signal from an amplitude modulator of the modulator portion of the envelope elimination and restoration (EER) transmitter.

In accordance with a fourth aspect of the invention there is provided a mobile communication device comprising:

an energy source arranged to output voltage in a predetermined battery voltage range as a battery voltage, means for inputting a battery voltage from the energy source arranged to output voltage in a predetermined battery voltage range, means for converting, connected to said means for inputting, arranged to convert the battery voltage to at least one supply voltage in such a way that the supply voltage is to be opposite in polarity to the battery voltage and the absolute value of the supply voltage is to be the same or close to the absolute value of the battery voltage, means for controlling, connected to the means for inputting, arranged to control the supply voltage independently from the battery voltage using a single converting mode for the supply voltage range, and a load connected to the output of means for converting arranged to receive continuously the supply voltage.

In one preferred embodiment of the invention there is provided a mobile communication device comprising means for changing a polarity of the energy source in accordance with the control signal.

Preferably, means for converting comprises a switched mode power supply (SMPS).

In another preferred embodiment of the invention there is provided means for controlling connected to a modulation portion of the transmitter to be arranged to receive a modulated radio frequency signal from the modulation portion.

Preferrably, means for controlling connected to a modulation portion of the envelope elimination and restoration (EER) transmitter is arranged to receive a modulated radio frequency signal from an amplitude modulator of the modulator portion of the envelope elimination and restoration (EER) transmitter.

Other objects and features of the present invention will become apparent from the following detailed description considered in conjunction with the accompanying drawings. It is to be understood, however, that the drawings are designed solely for purposes of illustration and not as a definition of the limits of the invention, for which reference should be made to the appended claims. It should be further understood that the drawings are not necessarily drawn to scale and that, unless otherwise indicated, they are merely intended to conceptually illustrate the structures and procedures described herein.

BRIEF DESCRIPTION OF THE DRAWINGS

An embodiment of the invention will be described in detail below, by way of example only, with reference to the accompanying drawings, of which

DETAILED DESCRIPTION OF THE INVENTION

Figure 1:
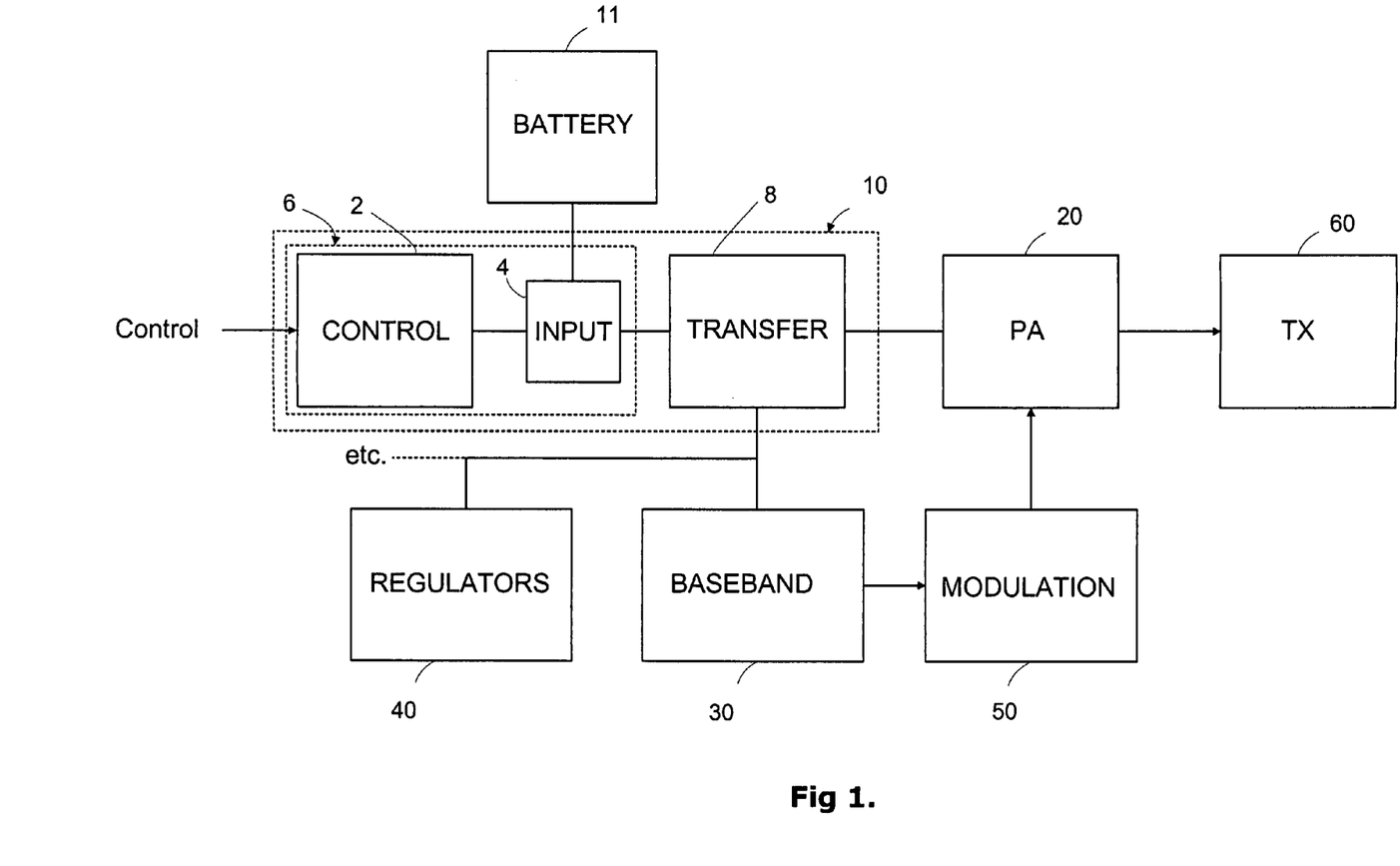
FIG. 1 depicts a partial circuit block diagram of mobile communication device and system in which a power supply circuit according to a first embodiment of the invention is concerned.

Referring to FIG. 1 there is shown a partial circuit block diagram of a mobile communication device in which a power supply circuit according to an embodiment of the invention provides at least one supply voltage to a load from an energy source. The mobile communication device comprises at least one load according to the invention. In an exemplary block diagram according to the invention, reference numeral 11 denotes an energy source, such as a battery, fuel cell or any other similar energy source, which all are referred as a battery in this application. Preferably, batteries used are lithium based batteries outputting battery voltages in a range of 1.2 volts to 4.5 volts. The mobile communication device can be provided with different types of batteries outputting battery voltages in a range of 1.2 volts to 4.5 volts according to the invention. Reference numerals 20, 30, 40 denote loads to be supplied by a supply voltage suitable for each load. This exemplary partial block diagram of the mobile communication device comprises such loads as a power amplifier 20 in association with a transmitter/transceiver portion 60, baseband portion 30 in association with a modulation portion 50 and regulators 40 to regulate voltages further where necessary.

To arrange the battery voltage from the battery 11 to be suitable for supplying the load the voltage controlling and converting functions are provided. In FIG. 1, reference numeral 10 denotes a DC-to-DC converter to perform the voltage controlling and converting functions. The converter circuit 10 comprises a transfer unit 8. More precisely, the transfer unit includes means for storing, transferring and filtering of the input energy. Preferably, the converter is a switched mode power supply (SMPS) type, high efficiency DC-to-DC converter. The converter circuit 10 also comprises a control circuit 2 to receive a control signal and control the supply voltage input to the load from the unit 8 in accordance with the control signal. Preferably, when a SMPS is used as the converter, the control circuit 2 is a SMPS control circuit 2. A switching device (SW) 4 is arranged to change a polarity of the battery voltage in accordance with the control signal received by the control circuit 2 and to input the battery voltage to the transfer circuit 8 to convert the battery voltage to at least one supply voltage defined for the appropriate load. Consequently, the SMPS control circuit 2 may be called the SMPS switch control circuit 2, too, but in the following description all these are referred as a control circuit. Preferably, the switching device 4 is integrated within the control circuit 2, as denoted in FIG. 1 by reference numeral 6.

Finally, the DC-to-DC converter 10 outputs a continuous supply voltage opposite in polarity to the battery voltage to the load. The continuous supply voltage means that the supply voltage is supplied continuously, stepless, to the load within the whole predetermined battery voltage range independent of a charge level of the battery. Thus, the continuous operation means that the load is supplied with the appropriate supply voltage using a single converting mode without changing mode from step-down to step-up mode and vice versa depending on the charge level of the battery, as in case of prior art, exposing to certain drawbacks described later.

The single converting mode is used for the output voltage range, which means that there is no mode change between step-down and step-up converting modes. Thus, the transfer unit 8 outputs very fast by the switching device 4 controlled by the control circuit 2 the full supply voltage range independent from the battery voltage. The control circuit 2 controls the switching device 4 which also serves as means for inputting the battery voltage from the energy source to the transfer unit 8. The control circuit 2 has a feedback loop from the output of the transfer unit 8, i.e. the feedback from the supply voltage, and consequently the control circuit 2 maintains the supply voltage in the desired value by monitoring and controlling the switching device 4.

The idea of the present invention is to provide a power supply arrangement in which the absolute value of the supply voltage is maintained the same or close to the same as the absolute value of the battery voltage but the polarity of the supply voltage is opposite to the polarity of the battery voltage, and that the supply voltage is controlled independently from the battery voltage. According to a preferred embodiment of the invention the absolute value of the supply voltage range overlaps the absolute value of the predetermined battery voltage range. According to another preferred embodiment of the invention the absolute value of the supply voltage range is in the absolute value of the predetermined battery voltage range.

According to one embodiment of the invention the converter circuit 10 comprises means for changing a polarity of the energy source 11 in accordance with the control signal received by the control circuit 2. When the initial state is that a negative (−) terminal of the energy source is grounded the changing of the polarity takes place by switching a positive (+) terminal of the energy source to be a ground terminal. Preferably, a polarity of the battery 11 is swapped by the switching device 4 in accordance with the control signal.

Figure 2:
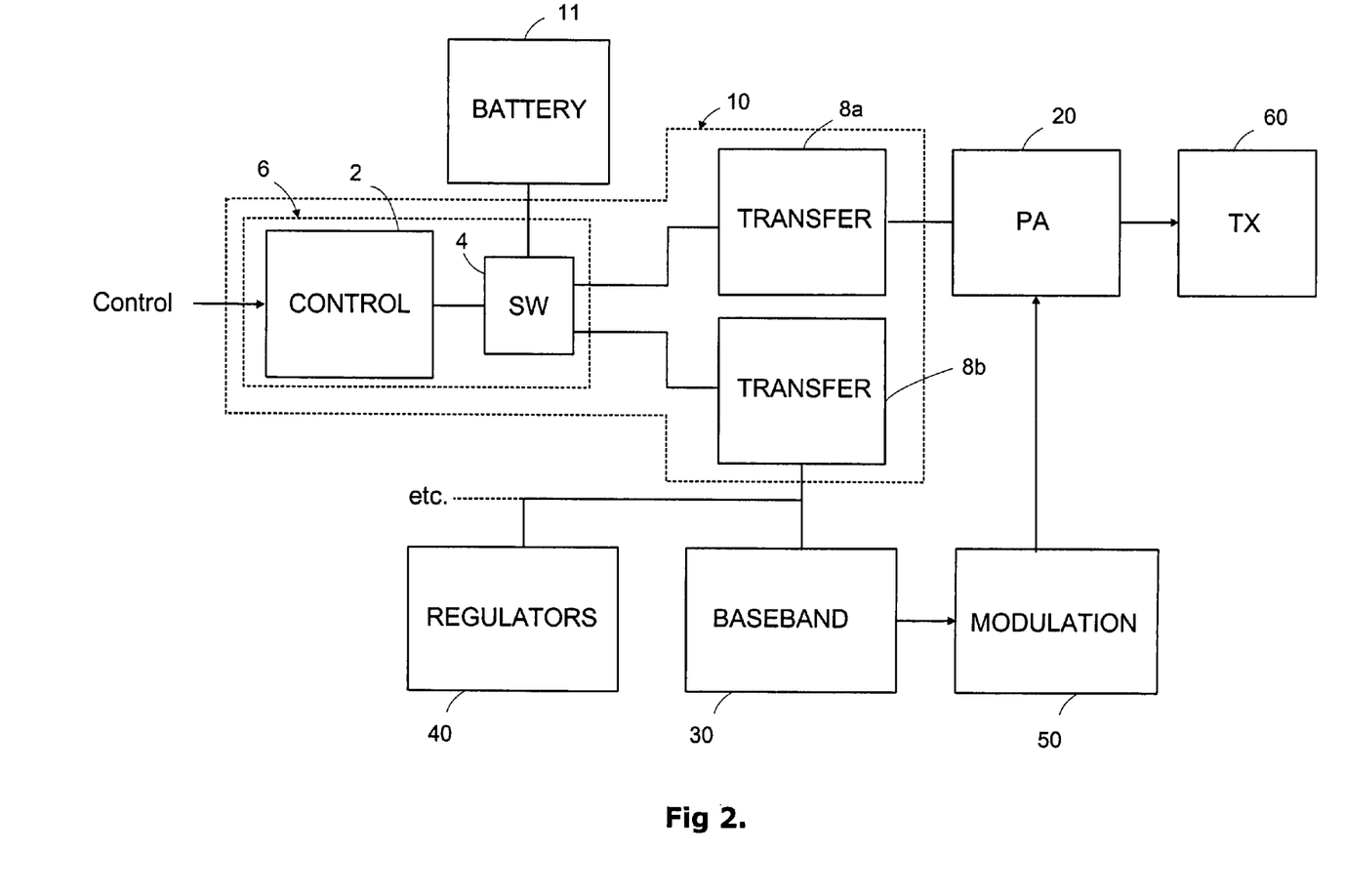
FIG. 2 depicts a partial circuit block diagram of mobile communication device and system in which a power supply circuit according to a second embodiment of the invention is concerned.

Referring to FIG. 2 there is shown a partial circuit block diagram of a mobile communication device in which a power supply circuit according to another embodiment of the invention provides at least one supply voltage to a load from an energy source. In an exemplary block diagram according to the invention, reference numeral 11 denotes an energy source referred as a battery in this application. Reference numerals 20, 30, 40 denote loads to be supplied by a supply voltage suitable for each load. Again, reference numeral 10 denotes a converter circuit to perform the voltage controlling and converting functions. The converter circuit 10 comprises two transfer units 8*a*, 8*b* to output the battery voltage to at least one supply voltage defined for each load. The converter circuit 10 also comprises a control circuit 2 to receive a control signal and control the supply voltage input to each load in accordance with the control signal. A switching device (SW) 4 is arranged to change a polarity of the battery voltage in accordance with the control signal received by the control circuit 2 and to input the battery voltage to the transfer units 8*a*, 8*b* to convert the battery voltage to at least one supply voltage defined for the appropriate load. According to the embodiment of FIG. 2 the switching device (SW) comprises, in fact, one switching circuit for a conversion branch 8*a* to output a first supply voltage to the power amplifier 20 and another switching circuit for a conversion branch 8*b* to output a second supply voltage to the baseband portion 30, regulators 40, etc. Preferably, the switching device 4 comprising all switching circuits is integrated within the control circuit 2, as denoted in FIG. 2 by reference numeral 6.

According to one embodiment of the invention the converter circuit 10 comprises means for changing a polarity of the energy source 11 in accordance with the control signal received by the control circuit 2. Preferably, a polarity of the battery 11 is swapped by the switching circuits synchronized within the switching device 4 in accordance with the control signal received.

Figure 3:
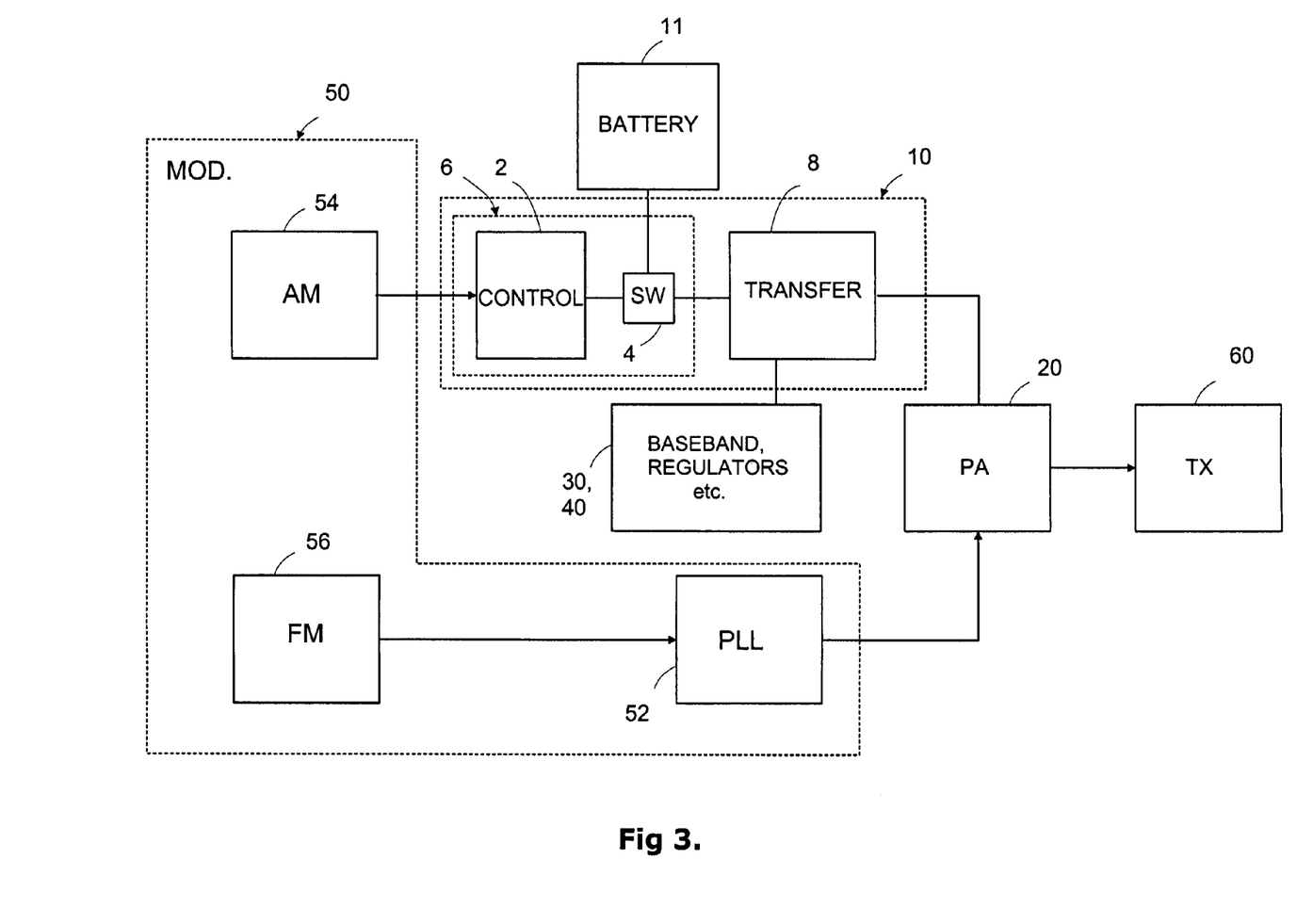
FIG. 3 depicts a partial circuit block diagram of mobile communication device and system in which a power supply circuit according to a third embodiment of the invention is concerned.

Referring to FIG. 3 there is shown a partial circuit block diagram of a mobile communication device in which a power supply circuit according to a preferred embodiment of the invention provides at least one supply voltage to a load from an energy source. In an exemplary block diagram according to the invention, reference numeral 11 denotes an energy source referred as a battery in this application. Reference numerals 20, 30, 40 denote the loads to be supplied by a supply voltage suitable for each load. Reference numeral 10 denotes a DC-to-DC converter circuit to perform the voltage controlling and converting functions and comprising at least one transfer unit 8 (including storing and filtering means as before), a switched mode power supply (SMPS) control circuit 2 and a switching device (SW) 4 as described earlier in accordance with FIGS. 1 and 2. Preferably, the switching device 4 comprising switching circuits is integrated within the control circuit 2, as denoted in FIG. 3 by reference numeral 6. According to one preferred embodiment of the invention the converter or power supply circuit 10 comprises means for changing a polarity of the energy source 11 in accordance with the control signal received by the control circuit 2. Preferably, a polarity of the battery 11 is swapped by the switching device 4 in accordance with the control signal received.

As shown in FIGS. 1 to 3 there is also depicted a modulator block 50 constituting a modulation portion in a partial circuit block diagram of the mobile communication device according to the invention. When an antenna of the transmitter/transceiver 60 is radiating radio frequency signal, data signals generated in the baseband portion 30 are modulated in the modulator 50 and the modulated signals are amplified to a required transmitting power level in the power amplifier 20 and then led through a transmitting circuitry of the transmitter/transceiver 60 to the antenna. To this signal path is referred with arrow lines in FIGS. 1 to 3 to differentiate the signal path from the operation voltage lines (lines without arrows between blocks).

According to the embodiment of the invention, as shown in FIG. 3, there is provided a control signal from the modulator block 50 to the control circuit 2 in the converter circuit 10. In this embodiment a RF transmitter/transceiver for mobile communication device is an envelope elimination and restoration (EER) RF transmitter/transceiver, where a symbol is represented using phase and amplitude components instead of complex in-phase/quadrature phase (I/Q) components. The EER transmitter/transceiver architecture comprises an amplitude modulation (AM) chain and a phase modulation (PM) chain which reference numerals 54 and 56 denote respectively. Data bits to be transmitted are converted to amplitude and phase signals in an appropriate converter, e.g. a bits to polar converter (not shown), which outputs the signals to an amplitude modulator (AM) 54 and to a frequency modulator (FM) 56. The frequency modulator 56 outputs a signal via a phase locked loop (PLL) 52 to the input of the power amplifier 20. The amplitude modulator 54 in turn after digital to analog convertion (not shown) outputs a signal to the input of the control circuit 2 in the power supply circuit 10. The purpose of this signal is to control the output level of the power amplifier 20 of the EER transmitter/transceiver. This modulated radio frequency signal is also the control signal according to preferred embodiment of the invention. Consequently, the supply voltage of the power amplifier 20, baseband portion 30, regulators 40, etc. is amplitude modulated by means of the transfer unit 8 that is connected between the battery 11 and power amplifier 20, baseband portion 30, regulators 40, etc. as shown in FIG. 3. The modulated radio frequency signal, preferably the amplitude modulated signal, can be used as a control signal in all above mentioned embodiments of the invention.

Figure 4:
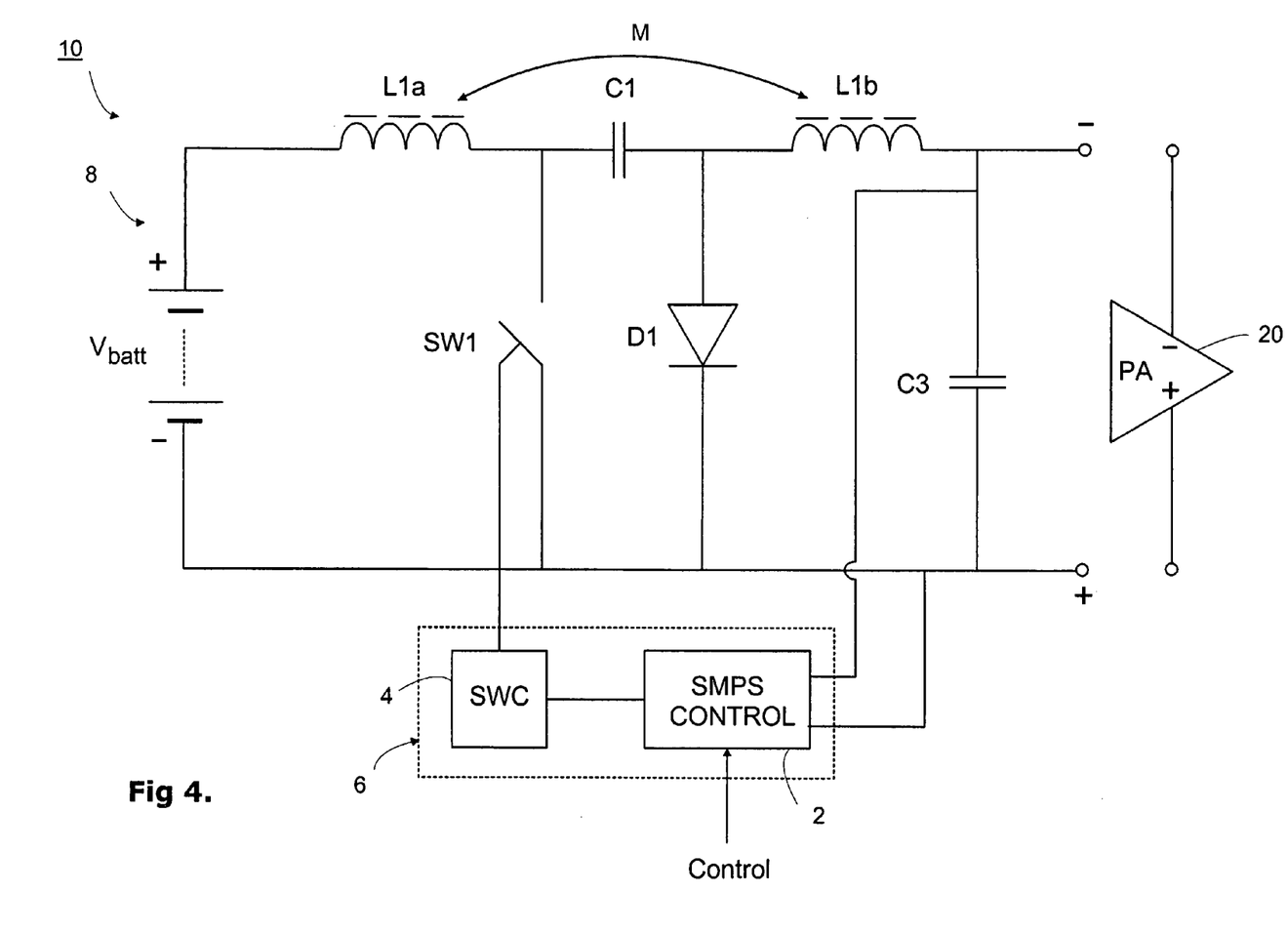
FIG. 4 depicts a circuit diagram of a power supply circuit according to a first embodiment of the invention.

Referring now to FIG. 4 there is depicted a circuit diagram of a power supply circuit according to one embodiment of the invention. In this exemplary circuit diagram, reference numeral 10 denotes a DC-to-DC converter, which performs the voltage controlling and converting functions and comprises at least one transfer unit 8, a switched mode power supply (SMPS) control circuit 2 and a switching circuit (SWC) 4. Preferably, the switching device 4 is integrated within the control circuit 2, as denoted in FIG. 4 by reference numeral 6. Reference numeral 20 denotes a load, preferably a power amplifier, to which the supply voltage is output from the power supply circuit 10.

In FIG. 4 the battery outputs a battery voltage Vbatt to the power supply circuit so that a positive terminal of the battery supplies positive voltage in relation to a ground level to the inductor L1a. A negative terminal of the battery is connected to the ground level. When the switch SW1 is turned on, current flows from the positive terminal of the battery through the inductor L1a and SW1, storing energy in inductor's L1a magnetic field. Then when SW1 is turned off, the voltage across L1a reverses to maintain current flow. Consequently, when SW1 is turned off, inductor L1a opposes any drop in current by immediately reversing its electromagnetic force, so that the inductor voltage is added to the battery voltage, and current due to this added inductor voltage now flows from the positive terminal through L1a and D1 and charging up capacitor C1 to a voltage somewhat higher than Vbatt and transferring to it some of the energy that was stored in L1a. Then when SW1 is turned on again, C1 discharges through via inductor L1b into the load, and inductor L1b and capacitor C2 are acting as a smoothing filter. Meanwhile energy is being stored again in inductor L1a, ready for the next cycle. In addition to voltage conversion the circuit also acts as a voltage inverter, i.e. the supply voltage is always reversed in polarity with respect to the battery voltage. Consequently, the supply voltage to the load 20 is a negative voltage in relation to the ground level. The switching circuit 4 controls operation of the switch SW1 to turn on and off in accordance with the control signal received by the control circuit 2, preferably the SWC 4 is integrated within the control circuit 2. The control circuit 2 also monitors the supply voltage to the load by means of feedback across the capacitor C3. According to one preferred embodiment of the invention the control signal received by the control circuit 2 is the modulated radio frequency signal which is output from the AM modulator 54 as described earlier in connection to FIG. 3.

In FIG. 4 the transfer unit 8 transfers voltage from the battery to the load both during the switch SW1 is turned on and off, which means that the load 20 is supplied continuously. If the capacitors C1 and C3 are selected to be very large a ripple voltage across the capacitors will be negligible. Also the purpose of the inductor L1b is to absorb the AC components in the voltage across D1 and if L1b is large enough the entire ripple component will be absorbed across it. Consequently, the DC-to-DC converter circuit outputs supply voltage with minimum ripple to the load 20. The ripple voltage absorbed across L1b has the same waveform as the voltage across L1a. By winding the L1b with identical number of turns as L1a on the same magnetic core M there is induced a voltage that balance the output ripple and consequently, the supply voltage to the load 20 is practically ripple-free. I.e. the DC-to-DC converter circuit has self ripple cancelling properties with minimum additional complexity.

As an example of the power supply circuit 10 according to an embodiment of the invention depicted in FIG. 4 some battery voltage and supply voltage ranges can be provided. The predetermined battery voltage range, e.g. in case of future lithium based batteries, can vary from 1.2 volts to 4.5 volts. According to this embodiment of the invention the DC-to-DC convertion circuit converts the whole battery voltage range 1.2-4.5 volts to an opposite in polarity, as an example say −3 volt supply voltage to output continuously to the power amplifier without any mode change. In this embodiment of the invention the power amplifier 20 is supplied by the negative supply voltage which means that a positive terminal of the PA needs to be RF-mounted instead of a negative terminal of the PA, i.e. as shown in FIG. 4 the positive terminal of the PA is to be connected to the ground level and the negative terminal of the PA is to be connected to the supply voltage. The most suitable PAs for this kind of use are processed by positive high electron mobility transistor (pHEMT) technology. The pHEMT power amplifiers have high frequency and low noise characteristics.

Figure 5:
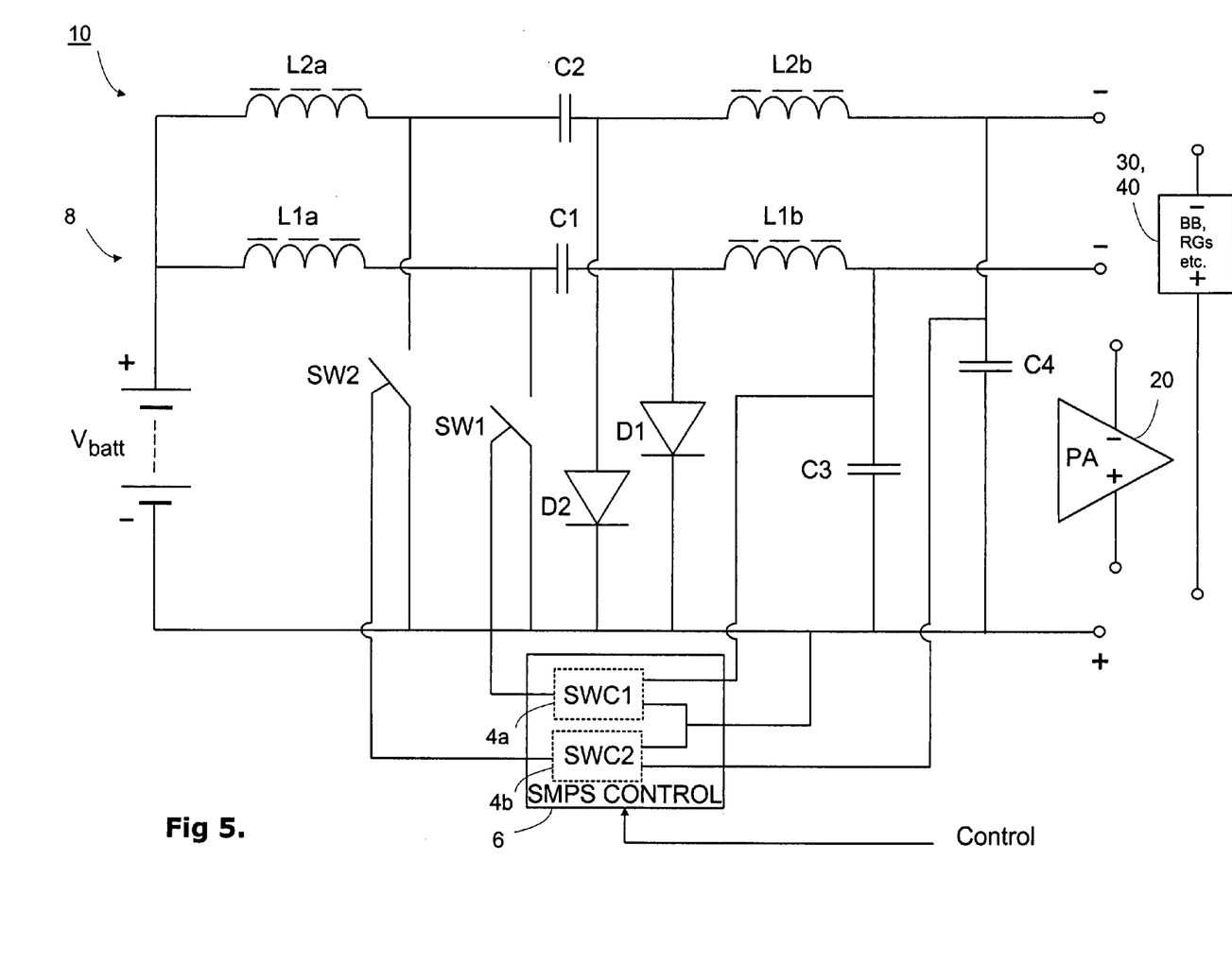
FIG. 5 depicts a circuit diagram of a power supply circuit according to a second embodiment of the invention.

Referring now to FIG. 5 there is depicted a circuit diagram of a power supply circuit according to another embodiment of the invention. In this exemplary circuit diagram, reference numeral 10 denotes a DC-to-DC converter circuit which performs the voltage controlling and converting functions and comprises at least one transfer unit 8, a switched mode power supply (SMPS) control circuit 2 and a switch (SW1, SW2) in connection with a switching circuit (SWC1, SWC2) 4a, 4b for each load. Preferably, the switching circuits 4a, 4b are integrated within the control circuit 2, as denoted in FIG. 5 by reference numeral 6. Reference numerals 20, 30, 40 denote loads to which the supply voltage is output from the power supply circuit 10. According to this embodiment of the invention the switch SW1 in connection to the switching circuit SWC1 4a supplies a first load 20, preferably a power amplifier, and the switch SW2 in connection to the switching circuit SWC2 4b supplies a second load 30, 40, preferably a baseband portion, regulators, etc. The operation of the power supply circuit 10 described in FIG. 5 is otherwise similar to as earlier described in accordance to FIG. 4, but it comprises two transfer units 8 which output supply voltages to have a different value but same polarity. In other words, a first DC-to-DC convertion circuits outputs the first supply voltage to the first load 20, preferably a power amplifier, and a second DC-to-DC convertion circuits outputs the second supply voltage to the second load 30, 40, preferably a baseband portion, regulators, etc. The second DC-to-DC convertion circuit comprises inductors L2a, L2b, capacitors C2, C4 and diode D2 to perform similar operation than the first DC-to-DC conversion circuit comprising inductors L1a, L1b, capacitors C1, C3 and diode D1 described in association to FIG. 4. As earlier described the first supply voltage to the first load 20 and the second supply voltage to the second load 30, 40 are negative voltages in relation to the ground level. The switching circuits 4a controls operation of the switch SW1 and the switching circuits 4b controls operation of the switch SW2 to turn on and off in accordance with the control signal received by the control circuit 2, preferably the SWC1 and SWC2 are integrated within the control circuit 2. The control circuit 2 also monitors the first and second supply voltage to the first and second load, respectively, as shown in FIG. 5, by means of feedback loops across the capacitors C3 and C4, respectively. According to one preferred embodiment of the invention the control signal received by the control circuit 2 is the modulated radio frequency signal which is output from the AM modulator 54 as described earlier in connection to FIG. 3.

As earlier explained with reference to FIG. 4, by winding the L1b with identical number of turns as L1a on the same magnetic core M1 there is induced a voltage that balance the output ripple and consequently, the supply voltage to the load 20 is practically ripple-free. Also by winding the L2b with identical number of turns as L2a on the same magnetic core M2 there is induced a voltage that balance the output ripple and consequently, the supply voltage to the load 30, 40 is practically ripple-free. I.e. the DC-to-DC converter circuit has self ripple cancelling properties with minimum additional complexity.

As an example of the power supply circuit 10 according to an embodiment of the invention depicted in FIG. 5 some battery voltage and supply voltage ranges can be provided. The predetermined battery voltage range, e.g. in case of future lithium based batteries, can vary from 1.2 volts to 4.5 volts. According to this embodiment of the invention the first DC-to-DC convertion circuit converts the whole battery voltage range 1.2-4.5 volts to an opposite in polarity, as an example say −3 volt supply voltage to output continuously to the power amplifier 20 without any mode change. The second DC-to-DC convertion circuit converts the whole battery voltage range 1.2-4.5 volts to an opposite in polarity, as an example say −2.7 volt supply voltage to output continuously to the baseband portion 30 and regulators 40 without any mode change. In this embodiment of the invention the power amplifier 20 is supplied by the negative supply voltage which means that a positive terminal of the PA needs to be RF-mounted instead of a negative terminal of the PA, i.e. as shown in FIG. 4 the positive terminal of the PA is to be connected to the ground level and the negative terminal of the PA is to be connected to the supply voltage. The most suitable PAs for this kind of use are processed by positive high electron mobility transistor (pHEMT) technology. The pHEMT power amplifiers have high frequency and low noise characteristics.

Figure 6:
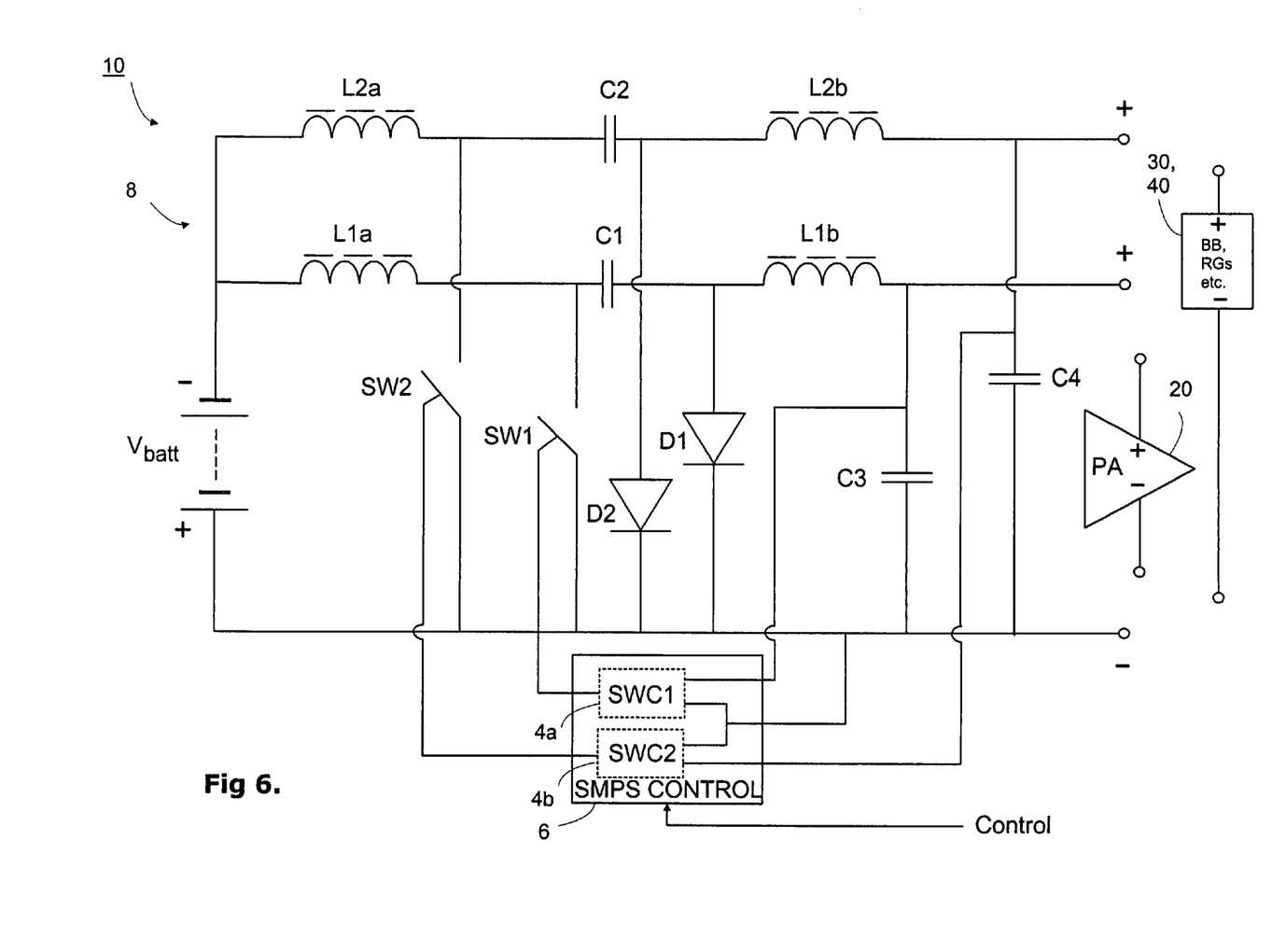
FIG. 6 depicts a circuit diagram of a power supply circuit according to a third embodiment of the invention.

Referring now to FIG. 6 there is depicted a circuit diagram of a power supply circuit according to a preferred embodiment of the invention. According to one preferred embodiment of the invention the power supply circuit 10 comprises means for changing a polarity of the energy source 11 in accordance with the control signal received by the control circuit 2. In this exemplary circuit diagram, a polarity of the battery and consequently a polarity of the battery voltage Vbatt is changed in accordance to a control signal before the DC-to-DC convertion takes place. According to this embodiment a positive (+) terminal of the energy source is grounded instead of a negative (−) terminal. Preferably, a polarity of the battery 11 is swapped by the switching device 4a, 4b in accordance with the control signal received. This means that when the polarity of the battery is changed it outputs the power supply circuit 10 a negative battery voltage −Vbatt. The operation of the power supply circuit 10 described in FIG. 6 is otherwise similar to as earlier described in accordance to FIG. 5, but now the battery outputs the battery voltage −Vbatt to the power supply circuit so that a negative terminal of the battery supplies negative voltage in relation to a ground level to the inductors L1a, L2a. A positive terminal of the battery is connected to the ground level. Consequently, the supply voltage to the load 20, 30, 40 is a positive voltage in relation to the ground level. The switching circuits SWC1, SWC2 4a, 4b control operation of the switches SW1, SW2, respectively, to turn on and off in accordance with the control signal received by the control circuit 2, preferably the SWC1 and SWC2 are integrated within the control circuit 2. The control circuit 2 also monitors the supply voltage to the load by means of feedback loops across the capacitors C3 and C4. According to one preferred embodiment of the invention the control signal received by the control circuit is the modulated radio frequency signal which is output from the AM modulator 54 as described earlier in connection to FIG. 3.

As earlier explained with reference to FIG. 4, by winding the L1b with identical number of turns as L1a on the same magnetic core M1 and the L2b with identical number of turns as L2a on the same magnetic core M2 there is induced a voltage that balance the output ripple and consequently, the supply voltages to the load 20, 30, 40 are practically ripple-free. I.e. the DC-to-DC converter circuit has self ripple cancelling properties with minimum additional complexity.

As an example of the power supply circuit 10 according to an embodiment of the invention depicted in FIG. 6 some battery voltage and supply voltage ranges can be provided. The predetermined battery voltage range, e.g. in case of future lithium based batteries, can vary from 1.2 volts to 4.5 volts. According to this embodiment of the invention the first DC-to-DC convertion circuit converts the whole (negative) battery voltage range −1.2−−4.5 volts to an opposite in polarity, as an example say +3 volt supply voltage to output continuously to the power amplifier 20 without any mode change. The second DC-to-DC convertion circuit converts the whole (negative) battery voltage range −1.2−−4.5 volts to an opposite in polarity, as an example say +2.7 volt or +1.5 volt supply voltage to output continuously to the baseband portion 30 and regulators 40 without any mode change. In this embodiment of the invention the power amplifier 20 is supplied by the positive supply voltage which means that a negative terminal of the PA is RF-mounted, i.e. as shown in FIG. 6 the positive terminal of the PA is to be connected to the supply voltage and the negative terminal of the PA is to be connected to the ground level.

According to one preferred embodiment of the invention the control signal received by the control circuit 2 is the modulated radio frequency signal which is output from the AM modulator 54 of the EER transmitter/transceiver as described earlier in connection to FIG. 3. According to this embodiment of the invention the first DC-to-DC convertion circuit converts the whole (negative) battery voltage range −1.2--4.5 volts to an opposite in polarity, as an example 0-+4 volt supply voltage range to output continuously to the power amplifier 20 without any mode change. Consequently, due to the stepless, continuous supply voltage output, drawbacks caused by mode change in megahertz range frequencies, are avoided. The continuous operation means that the load is supplied with the appropriate supply voltage without changing mode from step-down to step-up mode and vice versa depending on the charge level of the battery, as in case of prior art, exposing to oscillation, instability, etc. drawbacks.

According to still another preferred embodiment of the invention the diodes D1 and D2 described in association with FIGS. 4 to 6 are replaced with synchronous switches integrated within the control circuit chip 6.

Figure 7:
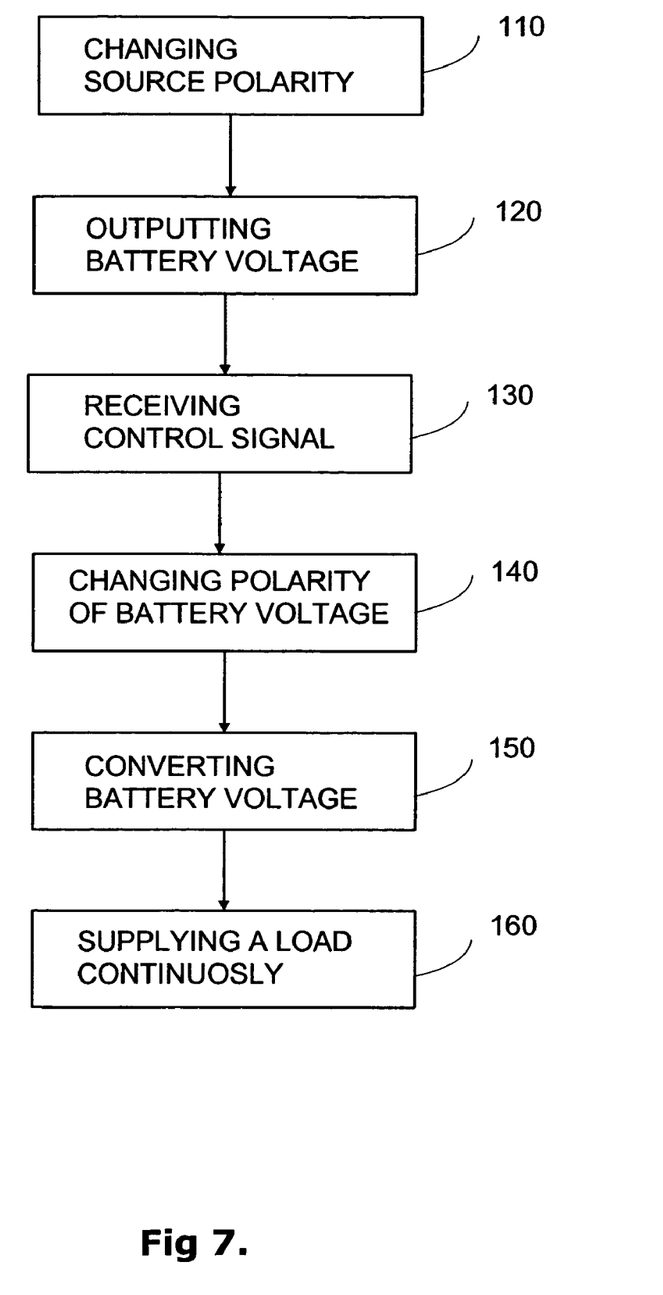
FIG. 7 depicts a flow chart of a method according to an embodiment of the invention.

Referring to FIG. 7 there is shown a flow chart of an embodiment of a method for providing at least one supply voltage to a load from an energy source in a portable communication device comprising at least one load according to the invention. The method comprises steps of outputting voltage from the energy source in a predetermined battery voltage range as a battery voltage 120, converting, i.e. changing a polarity of the battery voltage 140 in accordance with a control signal received 130, converting the battery voltage to at least one supply voltage defined for the load 150, and then supplying continuously to the load 160 the supply voltage opposite in polarity to the battery The idea of steps of converting 140, 150 is that the absolute value of the supply voltage is maintained the same or close to the same as the absolute value of the battery voltage but the polarity of the supply voltage is opposite to the polarity of the battery voltage, and that the supply voltage is controlled independent from the battery voltage. Also the absolute value of the supply voltage range overlaps the absolute value of the battery voltage range. The idea of step of supplying continuously 160 is that a single converting mode is used for the output voltage range, which means that there is no mode change between step-down and step-up converting modes. By providing a feedback from the supplying step 160 to the controlling and monitoring step 130 the supply voltage is maintained in the desired voltage value.

According to an embodiment of the invention the method comprises a step of changing a polarity of the energy source 110 in accordance with a control signal before conversion of the battery voltage to at least one supply voltage defined for the load. The step of supplying continuously to the load the supply voltage 160 is independent of a charge level of the energy source. According to a preferred embodiment of the invention the control signal is a modulated radio frequency signal received from a transmitter, preferably a modulated radio frequency signal received from an amplitude modulation chain in the envelope elimination and restoration (EER) transmitter. According to further embodiments of the invention the absolute value of the supply voltage overlaps the predetermined battery voltage range. According to further embodiments of the invention the absolute value of the supply voltage is in the predetermined battery voltage range, preferably in the middle of the predetermined battery voltage range. According to still further embodiments of the invention the absolute value of the supply voltage is outside of the predetermined battery voltage range, preferably lower than a lower limit of the predetermined battery voltage range.

Thus, while there have shown and described and pointed out fundamental novel features of the invention as applied to a preferred embodiment thereof, it will be understood that various omissions and substitutions and changes in the form and details of the devices illustrated, and in their operation, may be made by those skilled in the art without departing from the spirit of the invention. For example, it is expressly intended that all combinations of those elements and/or method steps which perform substantially the same function in substantially the same way to achieve the same results are within the scope of the invention. Moreover, it should be recognized that structures and/or elements and/or method steps shown and/or described in connection with any disclosed form or embodiment of the invention may be incorporated in any other disclosed or described or suggested form or embodiment as a general matter of design choice. It is intention, therefore, to be limited only as indicated by scope of the claims appended hereto.

The invention claimed is:

1. A power supply arrangement comprising:
    an energy source configured to provide at least one supply voltage to at least one load as a battery voltage,
    a switching device configured to output the battery voltage from the energy source in a predetermined battery voltage range,
    a converter, connected to the switching device, for converting the battery voltage to at least one supply voltage in such a way that the supply voltage is opposite in polarity to the battery voltage and the absolute value of the supply voltage is the same or close to the absolute value of the battery voltage, and
    a control circuit, connected to the switching device, for controlling the supply voltage independent from the battery voltage using a single converting mode for the supply voltage range.

2. The power supply arrangement according to claim 1, wherein the switching device comprises at least one switch for changing a polarity of the energy source in accordance with a control signal received by the control circuit.

3. The power supply arrangement according to claim 2, wherein the switching device comprises a first switch arranged to switch a first supply voltage opposite in polarity to the battery voltage to a first load and a second switch arranged to switch a second supply voltage opposite in polarity to the battery voltage to a second load.

4. The power supply arrangement according to claim 3, wherein the first supply voltage is arranged to have a different value but the same polarity than the second supply voltage.

5. The power supply arrangement according to claim 2, wherein the switching device comprises
    a first switch arranged to switch a first supply voltage to a power amplifier in accordance with the modulated radio frequency signal from the amplitude modulator of the modulator portion of the envelope elimination and restoration transmitter and a second switch arranged to switch
    a second supply voltage to a baseband portion and regulators in accordance with the modulated radio frequency signal from the amplitude modulator of the modulator portion of the envelope elimination and restoration transmitter.

6. The power supply arrangement according to claim 1, wherein the power supply arrangement is arranged to output continuously the supply voltage independent of a charge level of the energy source.

7. The power supply arrangement according to claim 1, wherein the converter comprises a switched mode power supply.

8. The power supply arrangement according to claim 7, wherein the switch of the switching device is integrated into the control circuit.

9. The power supply arrangement according to claim 1, wherein the control circuit is arranged to control the supply voltage using a step-down converting mode for the supply voltage range.

10. The power supply arrangement according to claim 1, wherein the control circuit is arranged to control the supply voltage using a step-up converting mode for the supply voltage range.

11. The power supply arrangement according to claim 1, wherein an input of the control circuit is connected to a modulation portion of the transmitter arranged to receive a modulated radio frequency signal from the modulation portion.

12. The power supply arrangement according to claim 1, wherein an input of the control circuit is connected to a modulation portion of the envelope elimination and restoration transmitter arranged to receive a modulated radio frequency signal from an amplitude modulator of the modulator portion of the envelope elimination and restoration transmitter.

13. The power supply arrangement according to claim 1, wherein the absolute value of the supply voltage range is arranged to overlap the absolute value of the predetermined battery voltage range.

14. The power supply arrangement according to claim 1, wherein the absolute value of the supply voltage is in the predetermined battery voltage range.

15. The power supply arrangement according to claim 1, wherein the absolute value of the supply voltage is outside of the predetermined battery voltage range.

16. A method for providing at least one supply voltage to a load from an energy source in a portable communication device comprising at least one load, wherein the method comprises:
   outputting a voltage from the energy source in a predetermined battery voltage range as a battery voltage,
   converting the battery voltage to at least one supply voltage opposite in polarity to the battery voltage,
   converting the battery voltage to at least one supply voltage so that the absolute value of the supply voltage is the same or close to the absolute value of the battery voltage, and
   controlling the supply voltage independent from the battery voltage using a single converting mode for the supply voltage range.

17. The method according to claim 16, wherein the method comprises changing the polarity of the energy source in accordance with a control signal received.

18. The method according to claim 17, wherein the method comprises converting a first supply voltage opposite in polarity to the battery voltage to a first load and a second supply voltage opposite in polarity to the battery voltage to a second load in accordance with the control signal.

19. The method according to claim 18, wherein the first supply voltage has a different value but the same polarity than the second supply voltage.

20. The method according to claim 17, wherein the control signal is a modulated radio frequency signal received from an amplitude modulation chain in the envelope elimination and restoration transmitter and the first load is a power amplifier and the second load is a baseband portion and regulators.

21. The method according to claim 16, wherein the method comprises outputting continuously the supply voltage independent of a charge level of the energy source.

22. The method according to claim 16, wherein controlling the supply voltage independent from the battery voltage uses a step-down converting mode for the supply voltage range.

23. The method according to claim 16, wherein controlling the supply voltage independent from the battery voltage uses a step-up converting mode for the supply voltage range.

24. The method according to claim 16, wherein the control signal is a modulated radio frequency signal received from a transmitter.

25. The method according to claim 16, wherein the control signal is a modulated radio frequency signal received from an amplitude modulation chain in the envelope elimination and restoration transmitter.

26. The method according to claim 16, wherein the absolute value of the supply voltage range overlaps the absolute value of the predetermined battery voltage range.

27. The method according to claim 16, wherein the absolute value of the supply voltage is in the predetermined battery voltage range.

28. The method according to claim 16, wherein the absolute value of the supply voltage is outside of the predetermined battery voltage range.

29. A system comprising:
   an energy source configured to provide at least one supply voltage to at least one load in a portable communication device as a battery voltage,
   a switching device configured to output the battery voltage from the energy source in a predetermined battery voltage range,
   a converter, connected to the switching device, for converting the battery voltage to at least one supply voltage in such a way that the supply voltage is opposite in polarity to the battery voltage and the absolute value of the supply voltage is the same or close to the absolute value of the battery voltage,
   a control circuit, connected to the switching device, for controlling the supply voltage independent from the battery voltage using a single converting mode for the supply voltage range, and
   the load connected to the output of the converter to receive continuously the supply voltage.

30. The system according to claim 29, wherein the switching device comprises at least one switch for changing a polarity of the energy source in accordance with a control signal received by the control circuit.

31. The system according to claim 30, wherein the switching device comprises a first switch arranged to switch a first supply voltage opposite in polarity to the battery voltage to a first load and a second switch arranged to switch a second supply voltage opposite in polarity to the battery voltage to a second load.

32. The system according to claim 31, wherein the first supply voltage is arranged to have a different value but the same polarity than the second supply voltage.

33. The system according to claim 30, wherein the switching device comprises a first switch arranged to switch a first supply voltage to a power amplifier in accordance with the modulated radio frequency signal from the amplitude modulator of the modulator portion of the envelope elimination and restoration transmitter and a second switch arranged to switch a second supply voltage to a baseband portion and regulators in accordance with the modulated radio frequency signal from the amplitude modulator of the modulator portion of the envelope elimination and restoration transmitter.

34. The system according to claim 29, wherein the system is arranged to output continuously the supply voltage independent of a charge level of the energy source.

35. The system according to claim 29, wherein the converter comprises a switched mode power supply.

36. The system according to claim 35, wherein the switch of the switching device is integrated into the control circuit.

37. The system according to claim 29, wherein the control circuit is arranged to control the supply voltage using a step-down converting mode for the supply voltage range.

38. The system according to claim 29, wherein the control circuit is arranged to control the supply voltage using a step-up converting mode for the supply voltage range.

39. The system according to claim 29, wherein an input of the control circuit is connected to a modulation portion of the transmitter arranged to receive a modulated radio frequency signal from the modulation portion.

40. The system according to claim 29, wherein an input of the control circuit is connected to a modulation portion of the envelope elimination and restoration transmitter arranged to receive a modulated radio frequency signal from an amplitude modulator of the modulator portion of the envelope elimination and restoration transmitter.

41. The system according to claim 29, wherein the absolute value of the supply voltage range is arranged to overlap the absolute value of the predetermined battery voltage range.

42. The system according to claim 29, wherein the absolute value of the supply voltage is in the predetermined battery voltage range.

43. The system according to claim 29, wherein the absolute value of the supply voltage is outside of the predetermined battery voltage range.

44. The system according to claim 29, wherein the energy source is a lithium based battery.

45. The system according to claim 29, wherein the energy source is a fuel cell.

46. A mobile communication device comprising:
an energy source configured to provide at least one supply voltage to at least on load of the mobile communication device as a battery voltage,
a switching device configured to output the battery voltage from the energy source in a predetermined battery voltage range,
a converter, connected to the switching device, for converting the battery voltage to at least one supply voltage in such a way that the supply voltage is opposite in polarity to the battery voltage and the absolute value of the supply voltage is the same or close to the absolute value of the battery voltage,
a control circuit, connected to the switching device, for controlling the supply voltage independent from the battery voltage using a single converting mode for the supply voltage range, and
the load connected to the output of the converter to receive continuously the supply voltage.

47. The mobile communication device according to claim 46, wherein the switching device comprises at least one switch for changing a polarity of the energy source in accordance with a control signal received by the control circuit.

48. The mobile communication device according to claim 47, wherein the switching device comprises a first switch arranged to switch a first supply voltage opposite in polarity to the battery voltage to a first load and a second switch arranged to switch a second supply voltage opposite in polarity to the battery voltage to a second load.

49. The mobile communication device according to claim 48, wherein the first supply voltage is arranged to have a different value but the same polarity than the second supply voltage.

50. The mobile communication device according to claim 47, wherein the switching device comprises a first switch arranged to switch a first supply voltage to a power amplifier in accordance with the modulated radio frequency signal from the amplitude modulator of the modulator portion of the envelope elimination and restoration transmitter and a second switch arranged to switch a second supply voltage to a baseband portion and regulators in accordance with the modulated radio frequency signal from the amplitude modulator of the modulator portion of the envelope elimination and restoration transmitter.

51. The mobile communication device according to claim 46, wherein the supply voltage is arranged to be output continuously independent of a charge level of the energy source.

52. The mobile communication device according to claim 46, wherein the converter comprises a switched mode power supply.

53. The mobile communication device according to claim 52, wherein the switch of the switching device is integrated into the control circuit.

54. The mobile communication device according to claim 46, wherein the control circuit is arranged to control the supply voltage using a step-down converting mode for the supply voltage range.

55. The mobile communication device according to claim 46, wherein the control circuit is arranged to control the supply voltage using a step-up converting mode for the supply voltage range.

56. The mobile communication device according to claim 46, wherein an input of the control circuit is connected to a modulation portion of the transmitter arranged to receive a modulated radio frequency signal from the modulation portion.

57. The mobile communication device according to claim 46, wherein an input of the control circuit is connected to a modulation portion of the envelope elimination and restoration transmitter arranged to receive a modulated radio frequency signal from an amplitude modulator of the modulator portion of the envelope elimination and restoration transmitter.

58. The mobile communication device according to claim 46, wherein the absolute value of the supply voltage range is arranged to overlap the absolute value of the predetermined battery voltage range.

59. The mobile communication device according to claim 46, wherein the absolute value of the supply voltage is in the predetermined battery voltage range.

60. The mobile communication device according to claim 46, wherein the absolute value of the supply voltage is outside of the predetermined battery voltage range.

61. The mobile communication device according to claim 46, wherein the energy source is a lithium based battery.

62. The mobile communication device according to claim 61, wherein the energy source is a lithium based battery outputting within a predetermined battery voltage range of 1.2 to 4.5 volts.

63. The mobile communication device according to claim 46, wherein the energy source is a fuel cell.

64. A power supply arrangement, comprising:
- an energy source, configured to provide at least one supply voltage to at least one load as a batter voltage,
- means for inputting the battery voltage from the energy source in a predetermined battery voltage range,
- means for converting, connected to said means for inputting, arranged to convert the battery voltage to at least one supply voltage in such a way that the supply voltage is opposite in polarity to the battery voltage and the absolute value of the supply voltage is the same or close to the absolute value of the battery voltage, and
- means for controlling, connected to the means for inputting, arranged to control the supply voltage independent from the battery voltage using a single converting mode for the supply voltage range.

65. The power supply arrangement according to claim 64, wherein the means for inputting comprises at least one switch for changing a polarity of the energy source in accordance with a control signal received by the means for controlling.

66. The power supply arrangement according to claim 64, wherein the power supply arrangement is arranged to output continuously the supply voltage independent of a charge level of the energy source.

67. A system for providing at least one supply voltage to a load from an energy source connected to the load in a portable communication device comprising at least one load, wherein the system comprises:
- the energy source, arranged to output voltage in a predetermined battery voltage range as a battery voltage,
- means for inputting the battery voltage from the energy source, arranged to output voltage in a predetermined battery voltage range,
- means for converting, connected to the means for inputting, arranged to convert the battery voltage to at least one supply voltage in such a way that the supply voltage is opposite in polarity to the battery voltage and the absolute value of the supply voltage is the same or close to the absolute value of the battery voltage,
- means for controlling, connected to the means for inputting, arranged to control the supply voltage independent from the battery voltage using a single converting mode for the supply voltage range, and
- the load, connected to the output of the means for converting, arranged to receive continuously the supply voltage.

68. A mobile communication device, comprising:
- an energy source, arranged to output voltage in a predetermined battery voltage range as a battery voltage,
- means for inputting the battery voltage from the energy source, arranged to output voltage in a predetermined battery voltage range,
- means for converting, connected to the means for inputting, arranged to convert the battery voltage to at least one supply voltage in such a way that the supply voltage is opposite in polarity to the battery voltage and the absolute value of the supply voltage is the same or close to the absolute value of the battery voltage,
- means for controlling, connected to the means for inputting, arranged to control the supply voltage independent from the battery voltage using a single converting mode for the supply voltage range, and
- the load, connected to the output of the means for converting, arranged to receive continuously the supply voltage.

* * * * *

UNITED STATES PATENT AND TRADEMARK OFFICE
CERTIFICATE OF CORRECTION

PATENT NO. : 7,245,888 B2 Page 1 of 1
APPLICATION NO. : 10/869480
DATED : July 17, 2007
INVENTOR(S) : Erkka Sointula It is certified that error appears in the above-identified patent and that said Letters Patent is hereby corrected as shown below:

In column 19, line 3, claim 64, line 3 "batter" should be --battery--.

Signed and Sealed this

Eighteenth Day of March, 2008

JON W. DUDAS
*Director of the United States Patent and Trademark Office*